US010784700B2

(12) United States Patent
Adelson

(10) Patent No.: US 10,784,700 B2
(45) Date of Patent: Sep. 22, 2020

(54) ARRANGEMENT FOR AND METHOD OF DYNAMICALLY MANAGING ELECTRICAL POWER BETWEEN AN ELECTRICAL POWER SOURCE AND AN ELECTRICAL LOAD

(71) Applicant: Nextek Power Systems, Inc., Detroit, MI (US)

(72) Inventor: Alex M. Adelson, Andes, NY (US)

(73) Assignee: Nextek Power Systems, Inc., Detroit, MI (US)

( * ) Notice: Subject to any disclaimer, the term of this patent is extended or adjusted under 35 U.S.C. 154(b) by 703 days.

(21) Appl. No.: 15/486,528

(22) Filed: Apr. 13, 2017

(65) Prior Publication Data

US 2017/0222443 A1 Aug. 3, 2017

Related U.S. Application Data

(63) Continuation-in-part of application No. 14/592,056, filed on Jan. 8, 2015, now Pat. No. 9,660,471, which is a continuation-in-part of application No. 12/905,312, filed on Oct. 15, 2010, now Pat. No. 8,957,543.

(51) Int. Cl.

*H02J 7/00* (2006.01)
*H02J 7/34* (2006.01)
*H02J 7/35* (2006.01)
*H02J 7/04* (2006.01)

(52) U.S. Cl.

CPC .......... *H02J 7/0068* (2013.01); *H02J 7/0013* (2013.01); *H02J 7/34* (2013.01); *H02J 7/045* (2013.01); *H02J 7/35* (2013.01); *Y02P 80/21* (2015.11); *Y10T 307/313* (2015.04); *Y10T 307/367* (2015.04); *Y10T 307/391* (2015.04)

(58) Field of Classification Search

CPC .................................................... H02J 7/0068

See application file for complete search history.

(56) References Cited

U.S. PATENT DOCUMENTS 5,278,747 A 1/1994 Falt
6,130,813 A * 10/2000 Kates .................... H02H 9/001 307/80
6,215,282 B1 * 4/2001 Richards .............. H01M 10/44 320/160

(Continued)

OTHER PUBLICATIONS

International search report and Written Opinion dated Jun. 15, 2018 mailed in corresponding International application No. PCT/USI8/27248.

*Primary Examiner* — Daniel J Cavallari
(74) *Attorney, Agent, or Firm* — Dickinson Wright PLLC

(57) ABSTRACT

Electrical power is dynamically managed a power source a load. A control switching system has a plurality of monitor nodes, a control switch having two switching states, and an electrical power storage cell connected to the power source in one of the switching states for storing voltage, and operative for discharging the stored voltage to the electrical load in the other of the switching states. A programmed controller dynamically monitors operating conditions at the monitor nodes during operation of the electrical load and the power source, and switches the control switch between the switching states in response to the monitored operating conditions for supplying a voltage of a desired waveform shape to the load.

6 Claims, 9 Drawing Sheets

(56) References Cited

U.S. PATENT DOCUMENTS

| | | | | |
|---|---|---|---|---|
| 6,794,839 | B1 | 9/2004 | Maslov | |
| 2012/0091802 | A1 | 4/2012 | Adelson | |
| 2012/0187920 | A1 * | 7/2012 | Zhong | H02J 7/0077 320/139 |

* cited by examiner

| CURRENT PATH STATES (3 VOLTAGE SUPPLY LEVELS $V_1$ $V_2$ & $V_3$) | | | | | | | | | | | | |
|---|---|---|---|---|---|---|---|---|---|---|---|---|
| X STATE | CIRCUIT | M1 | M2 | M3 | M4 | MA | MB | MC | MD | MX | MY | |
| CHARGE | STACK PARALLEL | X | 0 | X | 0 | 0 | 0 | 0 | 0 | X | X | |
| DISCHARGE | STACK PARALLEL | 0 | X | 0 | X | 0 | 0 | 0 | 0 | X | X | |
| CHARGE | STACK SERIES | 0 | 0 | 0 | 0 | X | 0 | X | 0 | 0 | 0 | |
| DISCHARGE | STACK SERIES | 0 | 0 | 0 | 0 | 0 | X | 0 | X | 0 | 0 | |
| CHARGE | INDEPEN'T | 0 | 0 | 0 | 0 | 0 | 0 | 0 | 0 | X | 0 | B-Cap 1 |
| DISCHARGE | INDEPEN'T | 0 | 0 | 0 | 0 | 0 | 0 | 0 | 0 | X | 0 | B-Cap 1 |
| CHARGE | INDEPEN'T | 0 | 0 | 0 | 0 | 0 | 0 | 0 | 0 | 0 | X | B-Cap 2 |
| DISCHARGE | INDEPEN'T | 0 | 0 | 0 | 0 | 0 | 0 | 0 | 0 | 0 | X | B-Cap 2 |
| CHARGE | INDEPEN'T | 0 | 0 | 0 | 0 | 0 | 0 | 0 | 0 | 0 | 0 | B-Cap 3 |
| DISCHARGE | INDEPEN'T | 0 | 0 | 0 | 0 | 0 | 0 | 0 | 0 | 0 | 0 | B-Cap 3 |

ARRANGEMENT FOR AND METHOD OF DYNAMICALLY MANAGING ELECTRICAL POWER BETWEEN AN ELECTRICAL POWER SOURCE AND AN ELECTRICAL LOAD

DESCRIPTION OF THE RELATED ART

Powered systems for supplying alternating current (AC) and direct current (DC) electrical power from a myriad of non-renewable energy sources that typically burn hydrocarbon fuel in engine-generators, turbine-generators, thermal-electric generators, fuel cells, etc., and from a myriad of renewable energy sources, such as photovoltaic cells, wind generators, hydroelectric devices, biomass generators, solar thermal systems, geothermal systems, etc., for delivery to various electrical inductive loads, such as motors and ballasts for fluorescent or vapor-arc lighting, and/or resistive loads, such as common filament light bulbs, and/or capacitive loads, such as capacitive motor starters, are well known. Since photovoltaic cells and wind generators, for example, depend upon an unpredictable availability of the source of energy, e.g. sunlight or wind, such renewable energy sources typically produce unpredictable, unregulated AC or DC power with uncontrolled frequency or voltage levels at uncertain, variable times. Hence, powered systems utilizing such sources typically collect and store energy in a DB battery bank over time, then apply the stored DC power directly to the loads as needed, and are typically operated as stand-alone systems. The battery bank provides a standby energy reservoir for the powered system.

Although generally satisfactory for their intended purpose, the known powered systems are inefficient. As noted above, the supply of power and voltage is erratic and variable because one or more of the electrical power sources may not be available at all times and, even when available, may not always be operating at its rated nominal power or voltage condition or most economical state. In addition, the loading condition of the various loads is variable as one or more loads are brought online and offline, as well as during the course of their normal operation. The above-mentioned battery bank serves to compensate for such variable power, voltage and loading conditions, but charging and recharging the battery bank takes a considerable time, thereby degrading system efficiency. System efficiency is lowered with no or poor management of which of the available power sources, and how much of the power and voltage from each of such available power sources, is to be distributed and delivered to the one or more of the loads that require such power and voltage, especially when all such actions advantageously need to be rapidly performed while the power, voltage and loading conditions vary. Greater efficiency is both an economic and conservation goal.

SUMMARY OF THE INVENTION

One aspect of the present disclosure resides, briefly stated, in an arrangement for dynamically and efficiently managing electrical power between an electrical power source that supplies electrical power and an electrical load that consumes electrical power. The arrangement includes a control switching system having a plurality of monitor nodes, a control switch having two switching states, and an electrical power storage cell operatively connected to the power source in one of the switching states for storing voltage, and for discharging the stored voltage to the electrical load in the other of the switching states. A programmed controller is operatively connected to the monitor nodes for dynamically monitoring operating conditions at the monitor nodes during operation of the electrical load and the power source, and is operatively connected to the control switch for switching the control switch between the switching states in response to the monitored operating conditions for supplying a voltage of a desired waveform shape to the load.

The power source can include one or more of any alternating current (AC) source, such as an AC power grid or supply mains, any direct current (DC) source, or any combined AC/DC source. The source can include any non-renewable energy source, for example, one that typically burns hydrocarbon fuel in engine-generators, turbine-generators, thermal-electric generators, fuel cells, etc., or any renewable energy source, such as photovoltaic cells, wind generators, hydroelectric devices, biomass generators, solar thermal systems, geothermal systems, etc. The load can include one or more of any electrical inductive loads, such as motors and ballasts for fluorescent or vapor-arc lighting, and/or any resistive loads, such as common filament light bulbs, and/or any capacitive loads, such as capacitive motor starters.

The arrangement includes an input terminal connected to each source, an output terminal connected to each load, and a plurality of the monitor nodes is connected to each input terminal and each output terminal. The electrical power storage cell is connected between the input and output terminals that are associated with the source. If there is a plurality of sources, then a power storage cell is connected between the input and output terminals that are associated with each source. As described below, each cell is capable of storing voltage from at least one of the sources and is capable of discharging stored voltage to at least one of the loads. Preferably, each cell includes a capacitor by itself, or a parallel combination of a battery and a capacitor, for storing DC voltage from the at least one source and for discharging the stored DC voltage to the at least one load. Advantageously, each such cell acts as a voltage regulator and filter, is rechargeable and has an extremely low internal resistance for rapid recharging with a high efficiency in energy storage exceeding 95%. The cells are preferably architecturally identical and interchangeable with one another. At least one of the cells is arranged in a base layer.

The control switch is connected to the cell and has a control input for enabling the switch to be switched between the switching states. If there is a plurality of cells, then a control switch is connected to each cell. Advantageously, each switch is a transistor having a gate, a base or a trigger as the control input. Each switch can, for example, be a solid-state switch, such as a field effect transistor (FET), especially a HEXFET or a MOSFET, or a FlipFET, or an insulated gate bipolar transistor (IGBT), or a silicon controlled rectifier (SCR), or their equivalent, e.g., a relay. A plurality of diodes is also connected in the arrangement to control the direction of DC current flowing between the input and output terminals. The diodes block the flow of the DC current along unwanted paths through the arrangement. At least one of the switches and another of the cells are together arranged in a switching layer.

The programmed controller includes, in one embodiment, a single master controller for controlling all the layers, and, in another embodiment, a slave controller for each layer, with the master controller operatively connected to each slave controller. The programmed controller is operative for dynamically monitoring operating conditions, e.g., operating voltages, at the monitor nodes during operation of each source and each load, and for selectively dynamically controlling the switches at their control inputs to interconnect the cells in different circuit topologies in response to the monitored operating conditions, The programmed controller enables each cell in one of the switching states, e.g., a closed state, to store the voltage from at least one of the sources, and enables each cell in the other of the switching states, e.g., an open state, to discharge the stored voltage to at least one of the loads. Thus, by controlling each switch, the programmed controller supplies a voltage of a desired waveform shape to each load.

The programmed controller advantageously accesses a memory or look-up table with data corresponding to the stored circuit topologies, and retrieves the data in response to the monitored operating conditions. For example, in some different topologies, all the cells are connected in series and/or in parallel and/or in series-parallel with one another for charging and/or discharging; and in other different topologies, individual cells are selected for charging and/or discharging. The various topologies can be simultaneously or sequentially implemented in single or multiple steps.

The arrangement, also called a module, comprises the aforementioned base layer and one or more of the aforementioned switching layers. The module can have any number of switching layers and, hence, the module is readily scalable. This not only reduces cost, but also enables the resolution or number of switching layers to be selected as desired for a particular application. The switching layers can be arranged in mutually perpendicular planes. For example, one or more of the switching layers can be interconnected in two dimensions and lie in a horizontal or X-Y plane, and then, one or more additional switching layers can be interconnected in a third dimension and lie in a vertical or Z plane, thereby greatly increasing the number of available circuit topologies that can be selected by the controller. Furthermore, the arrangement is symmetrical, in that the aforementioned input terminals, as well as the aforementioned output terminals, can be located at either a right side or a left side of the arrangement, thereby enabling the external sources or the external loads to be connected at either side of the arrangement.

Still another feature of the present disclosure resides in a method of dynamically and efficiently managing electrical power between an electrical power source that supplies electrical power and an electrical load that consumes electrical power. The method is performed by operatively connecting an electrical power storage cell to the power source in one of two switching states of a control switch for storing voltage, and by discharging the stored voltage to the electrical load in the other of the switching states of the control switch. The method is further performed by dynamically monitoring operating conditions at a plurality of monitor nodes during operation of the electrical load and the power source, and by switching the control switch between the switching states in response to the monitored operating conditions for supplying a voltage of a desired waveform shape to the load.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
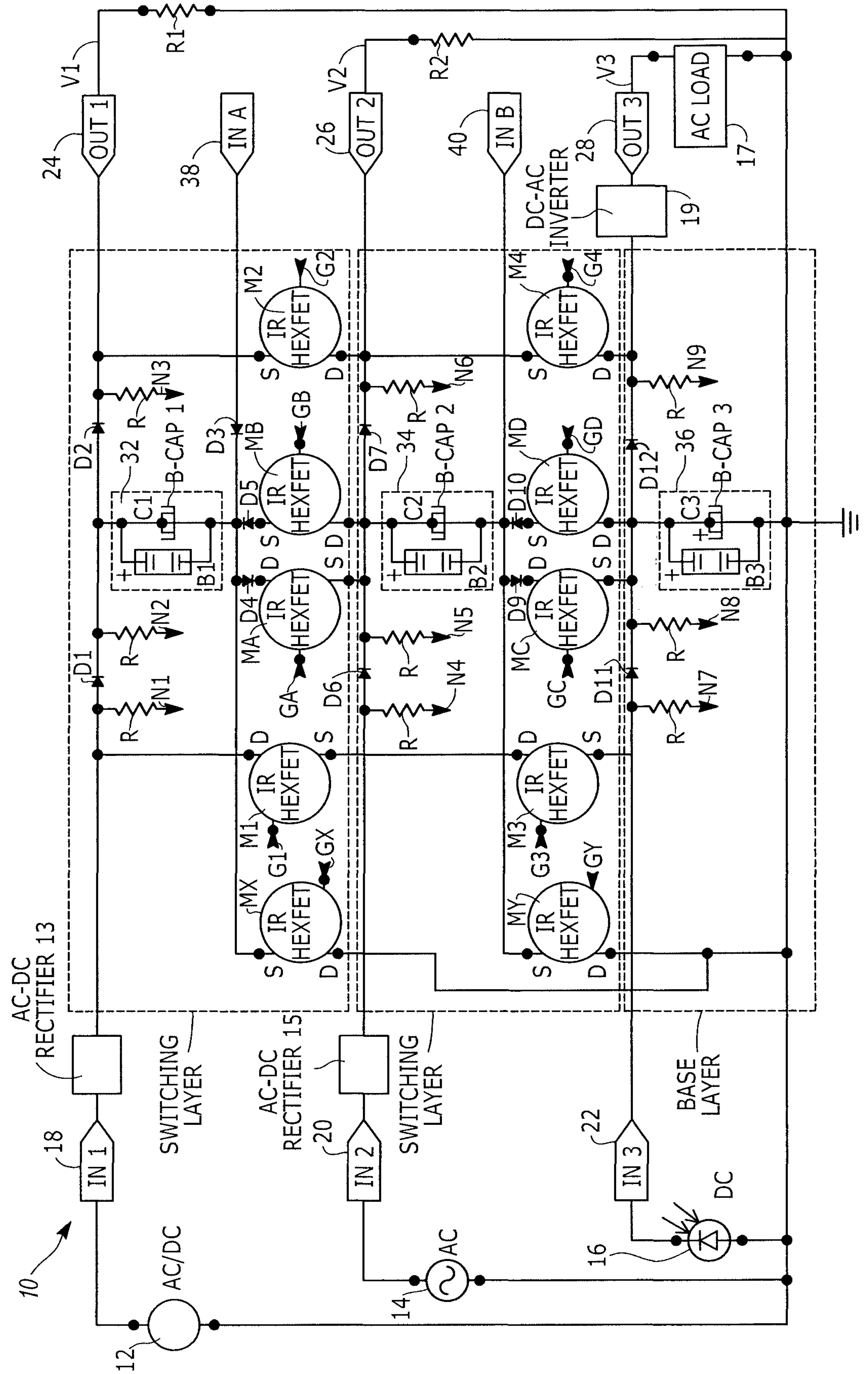
FIG. 1 is an electrical circuit schematic of part of one embodiment of an arrangement for dynamically managing electrical power between at least one electrical power source and at least one electrical. load in accordance with this disclosure.

Reference numeral 10 generally identifies an arrangement for dynamically and efficiently managing electrical power among one or more external electrical power sources 12, 14 and 16 that supply electrical power and one or more external electrical loads R1, R2 and R3 that consume electrical power. The sources can include any alternating current (AC) source 14, such as an AC power grid or supply mains, any direct current (DC) source 16, or any combined AC/DC source 12. The sources 12, 14 and 16 can include any non-renewable energy source, for example, one that typically burns hydrocarbon fuel in engine generators, turbine-generators, thermal-electric generators, fuel cells, etc., or any renewable energy source, such as photovoltaic cells, wind generators, hydroelectric devices, biomass generators, solar thermal systems, geothermal systems, etc, Although three sources are illustrated in FIG. 1, any number of sources, including just one source, can be employed. The loads R1, R2 and R3 can include any electrical inductive loads, such as motors and ballasts for fluorescent or vapor-arc lighting, and/or any resistive loads, such as common filament light bulbs, and/or any capacitive loads, such as capacitive motor starters. Although three loads are illustrated in FIG. 1, any number of loads, including just one load, can be employed.

Figure 6:
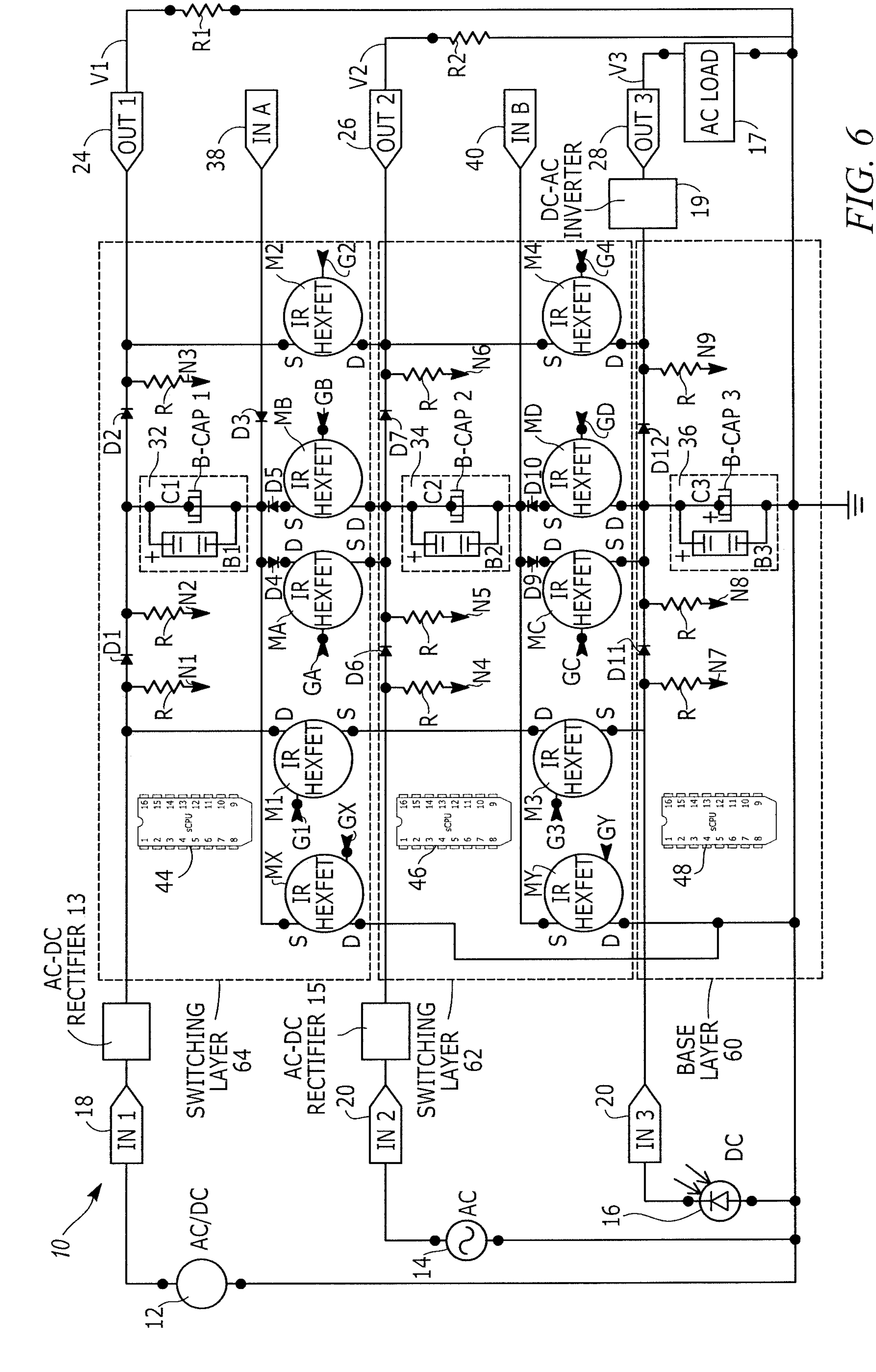
FIG. 6 is an electrical circuit schematic of still another embodiment of an arrangement for dynamically managing electrical power between at least one electrical power source and at least one electrical load in accordance with this invention, and is analogous to FIG. 1, but depicting a plurality of slave controllers.
Figure 7:
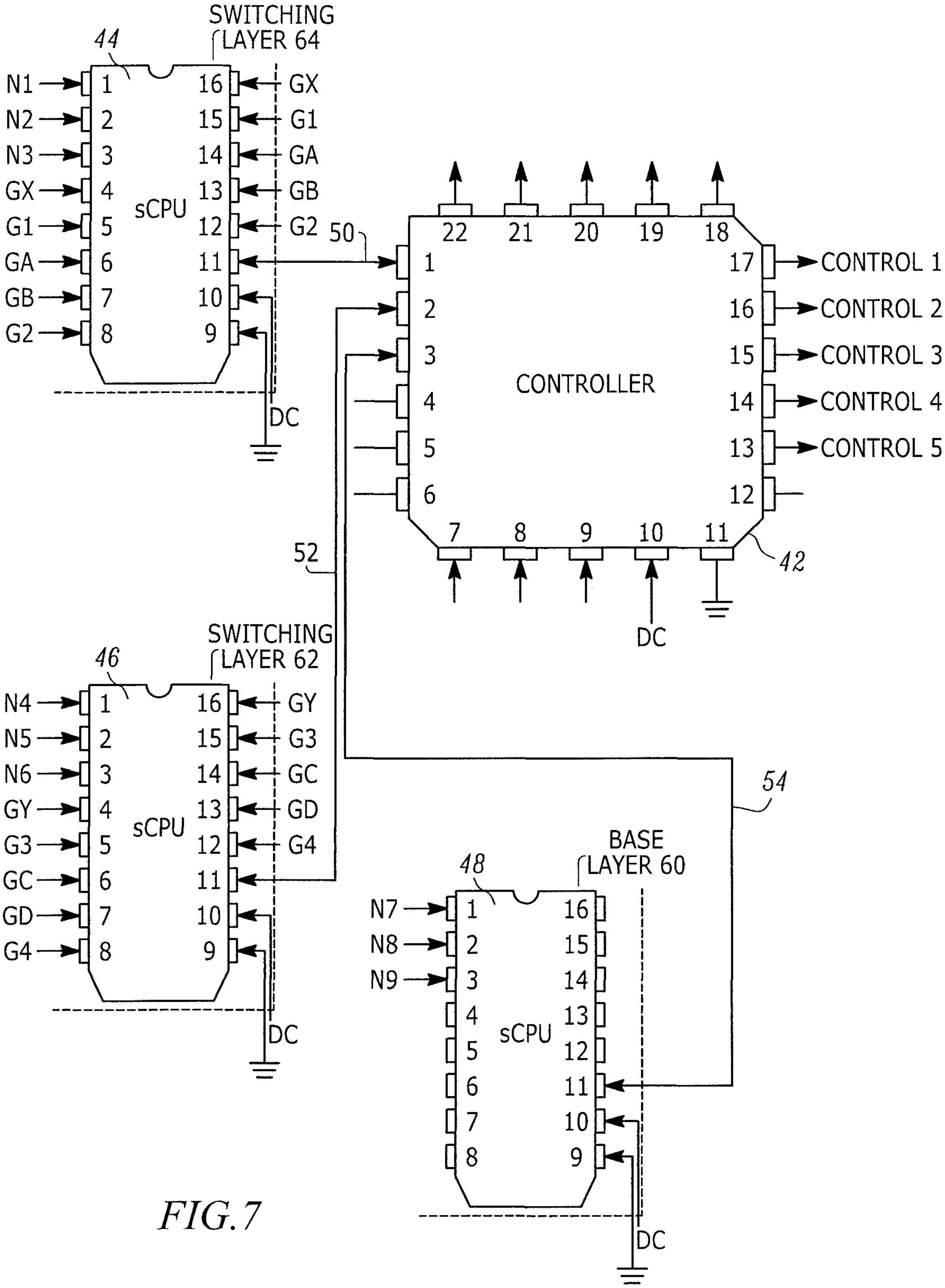
FIG. 7 is an electrical circuit schematic depicting how a master controller is connected to each slave controller in the embodiment of FIG. 6.

The arrangement 10 includes at least one input terminal and, as illustrated, a plurality of input terminals 18, 20 and 22 (labeled IN 1, IN 2 and IN 3) connected to each source 12, 14 and 16, at least one output terminal and, as illustrated, a plurality of output terminals 24, 26 and 28 (labeled OUT 1, OUT 2 and OUT 3) connected to each load R1, R2 and R3, and a plurality of monitor nodes N1, N2, N3, N4, N5, N6, N7, N8, and N9, each connected to the input and output terminals via a resistor R. As described below, a programmed control system dynamically monitors operating conditions, e.g., operating voltages, at the monitor nodes during operation of the sources and the loads. In the embodiments of FIGS. 1-5 and 8-10, the control system comprises a single master controller 30 (see FIG. 2). In the embodiment of FIGS. 6-7, the control system comprises a single master controller 42 and a plurality of slave controllers 44, 46 and 48 (see FIG. 7). The master controller 30 of FIG. 2 has input pins 1-9 respectively connected to the monitor nodes N1, N2, N3, N4, N5, N6, N7, N8, and N9.

A plurality of diodes D1, D2, D6, D7, D11 and D12 is also connected in the arrangement 10 to control the direction of DC current flowing between the input and output terminals. The diodes block the flow of the DC current along unwanted paths. Monitor nodes N1, N4 and N7 are respectively connected to input terminals 18, 20 and 22. Monitor nodes N3, N6 and N9 are respectively connected to output terminals 24, 26 and 28. Diodes D1, D6 and D11 are connected between monitor node pairs N1, N2; N4, N5; and N7, N8.

A plurality of electrical power storage cells 32, 34 and 36 is connected among the input and output terminals. As described below, each cell 32, 34 and 36 is capable of storing power from at least one of the sources and is capable of discharging stored power to at least one of the loads, Preferably, each cell 32, 34 and 36 includes a capacitor by itself, or a parallel combination of a battery (B1, B2 and B3) and a capacitor (C1, C2 and C3), for storing DC voltage from the at least one source and for discharging the stored DC voltage to the at least one load. Advantageously, each such cell (also labeled B-CAP 1, B-CAP 2 and B-CAP 3), acts as a voltage regulator and filter, is rechargeable and has an extremely low internal resistance for rapid recharging with a high efficiency in energy storage exceeding 95%. Advantageously, the cells are electronic double layer capacitors, also known as supercaps or ultracaps. The cells 32, 34 and 36 are preferably architecturally identical and interchangeable with one another.

The arrangement 10 further includes a plurality of controllable switches M1, M2, M3 and M4 connected to the cells and having control inputs G1, G2, G3 and G4 for enabling each switch to be switched between open and closed switching states. Advantageously, each switch is a transistor having a gate, a base or a trigger as the control input. Each switch can, for example, be a solid-state switch, such as a field effect transistor (FET), especially a HEXFET (as illustrated) or a MOSFET, or a FlipFET, or an insulated gate bipolar transistor (IGBT), or a silicon controlled rectifier (SCR), or their equivalent, e.g., a relay. Switch M1 is connected across cell 32 between input terminals 18, 20. Switch M2 is connected across cell 32 between output terminals 24, 26. Switch M3 is connected across cell 34 between input terminals 20, 22. Switch M4 is connected across cell 34 between output terminals 26, 28.

The arrangement 10 further includes a plurality of control input terminals 38, 40 (labeled IN A and IN B). A parallel combination, having diode D4 and switch MA in one branch, and diode D5 and switch MB in another branch, is connected across terminals 38 and 26, and interconnects cells 32 and 34. Another parallel combination, having diode D9 and switch MC in one branch, and diode D10 and switch MD in another branch, is connected across terminals 40 and 28, and interconnects cells 34 and 36. Switches MA, MB, MC and MD have control inputs GA, GB, GC and GD. Additional switch MX having control input GX is connected via diode D3 between terminal 38 and ground. Additional switch MY having control input GY is connected via diode D8 between terminal 40 and ground.

The master controller 30, as previously mentioned, dynamically monitors the operating conditions, e.g., the operating voltages, at all the monitor nodes N1, N2, N3, N4, N5, N6, N7, N8, and N9 during operation of each source and each load. The master controller 30 detects the voltages at one or more of these nodes, and determines, for example, whether a particular source is supplying power, and/or whether a particular load is receiving power. The master controller 30 also selectively dynamically controls all the switches M1, M2, M3, M4, MA, MB, MC, MD, MX and MY at their respective control inputs to interconnect the cells 32, 34 and 36 in different circuit topologies in response to the monitored operating conditions. The controller 30 has output pins 12-17 and 19-22 respectively connected to these control inputs. Pin 10 is supplied with a DC voltage. Pin 11 is grounded. Pin 18 is reserved. The controller 30, the cells 32, 34 and 36, and all the switches M1, M2, M3, M4, MA, MB, MC, MD, MX and MY are DC devices. Hence, AC-to-DC rectifiers 13 and 15 are employed to convert the AC voltages supplied by the respective AC sources 12 and 14 to DC voltages. Analogously, a DC-to-AC inverter 19 is connected at the AC load 17.

The master controller 30 enables each cell in one of the switching states, e.g., a closed state, to store the voltage from at least one of the sources, and enables each cell in the other of the switching states, e.g., an open state, to discharge the stored voltage to at least one of the loads. The master controller 30 advantageously accesses a memory or look-up table (see FIG. 3) with data corresponding to the stored circuit topologies, and retrieves the data in response to the monitored operating conditions. For example, in some different topologies, all the cells are connected in series and/or in parallel and/or in series-parallel with one another for charging and/or discharging; and in other different topologies, individual cells are selected for charging and/or discharging. The various topologies can be simultaneously or sequentially implemented in single or multiple steps.

Figures 2, 3:
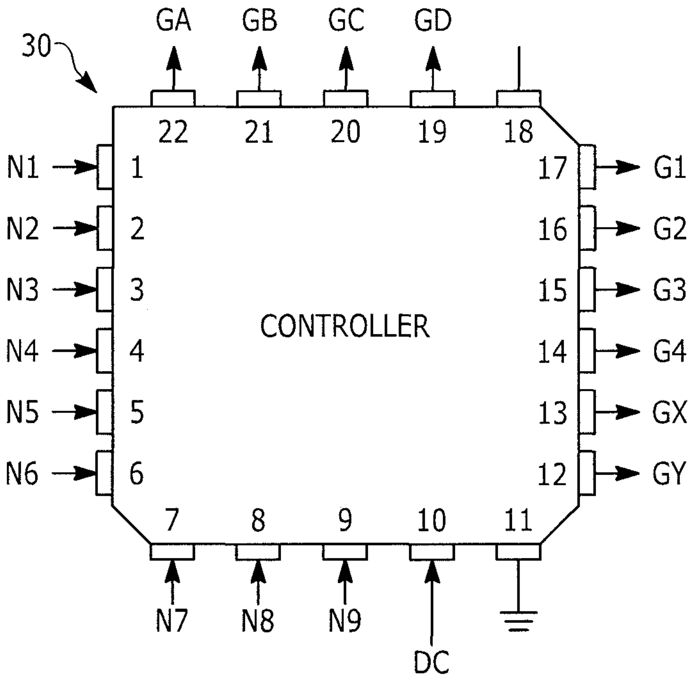
FIG. 2 is a programmed controller for use with the arrangement of FIG. 1.
FIG. 3 is a look-up table accessed by the controller of FIG. 2.

More particularly, the table of FIG. 3 depicts the switches M1, M2, M3, M4, MA, MB, MC, MD, MX and MY across a top row. The first column indicates whether the cells are charged or discharged. The second column indicates the topology. An "X" at the intersection of a column and a row indicates that a particular switch is switched by the controller 30 to a closed state. An "O" at the intersection of a column and a row indicates that a particular switch is switched by the controller 30 to an open state.

Figure 4:
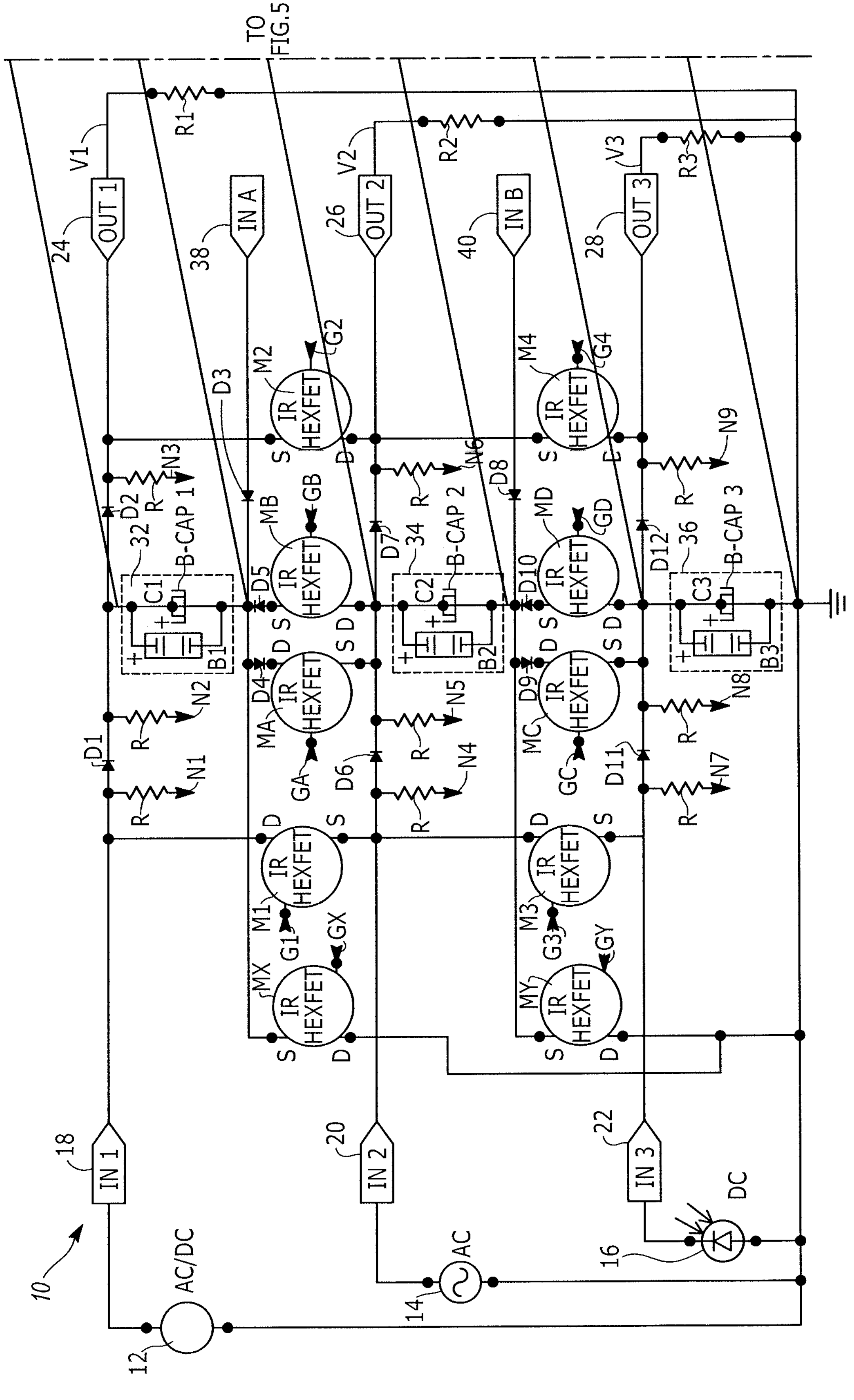
FIG. 4 and FIG. 5 together comprise an electrical circuit schematic of another embodiment of the arrangement in accordance with this disclosure.
Figure 5:
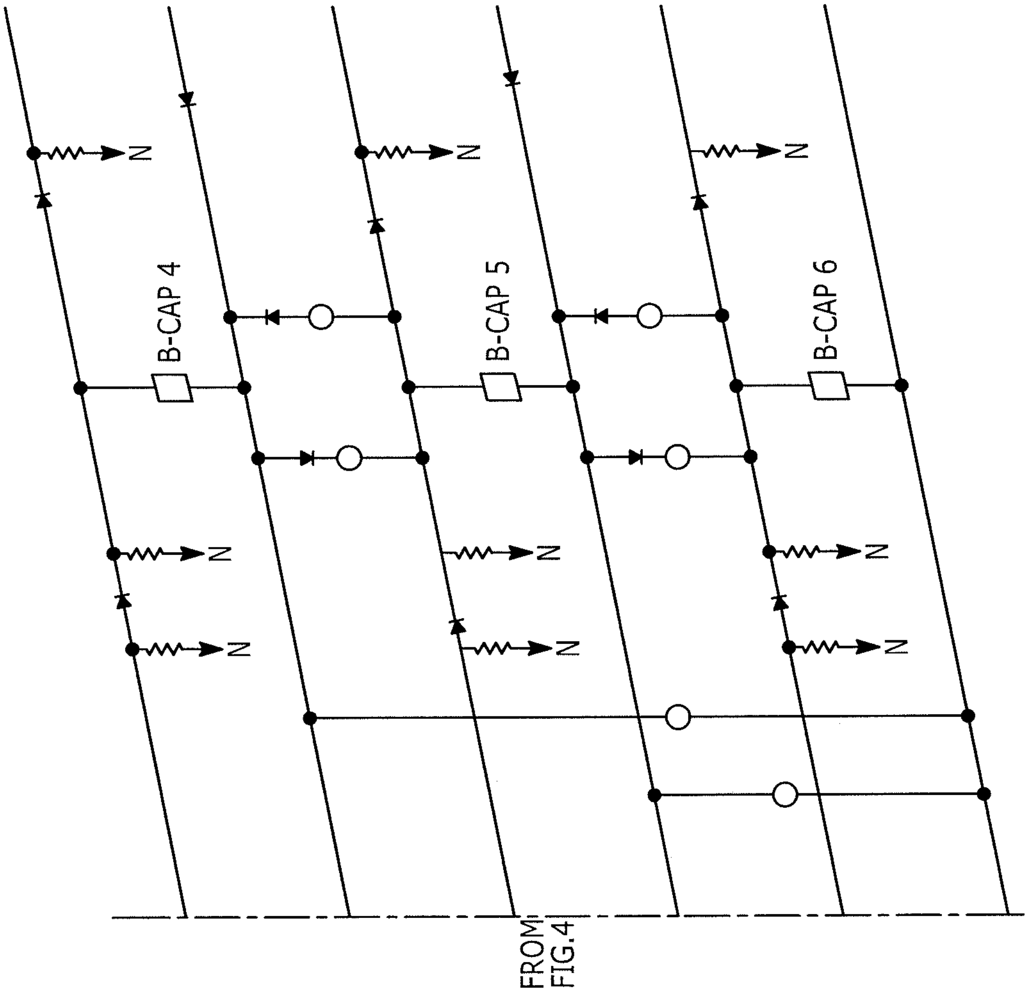

The cells are preferably arranged in layers. One of the cells, e.g., 36, is arranged in a base layer 60, preferably together with the diodes D11 and D12 and with the monitor nodes N7, N8 and N9. Another of the cells, e.g., 34, is arranged in a switching layer 62, together with one or more of the switches M3, M4, MC, MD and MY, and with the diodes D6 and D7, and with the monitor nodes N4, N5 and N6. Still another of the cells, e.g., 32, is arranged in another switching layer 64, together with one or more of the switches M1, M2, MA, MB and MX, and with the diodes D1 and D2, and with the monitor nodes N1, N2 and N3, The arrangement, also called a module, comprises one base layer 60 and one or more of the switching layers 62, 64. The module can have any number of switching layers and, hence, the module is readily scalable. This not only reduces cost, but also enables the resolution or number of layers to be selected as desired for a particular application. The layers can be arranged in mutually perpendicular planes. For example, the aforementioned base layer 60 and one or more of the aforementioned switching layers 62, 64 can be interconnected in two dimensions and lie in a horizontal or X-Y plane, and then, additional switching layers, which each include additional cells B-CAP 4, B-CAP 5 and B-CAP 6, as best seen in FIG. 4, can be interconnected in a third dimension and lie in a vertical or Z plane, thereby greatly increasing the number of available circuit topologies that can be selected by the controller. Furthermore, the arrangement is symmetrical and bi-directional, in that the input terminals 12, 14 and 16, as well as the output terminals 24, 26 and 28, can be located at either a right side or a left side of the arrangement, thereby enabling the external sources or the external loads to be connected at either side of the bi-directional arrangement.

The multiple path, symmetrical, matrix-like, architecture enables the arrangement 10 to be infinitely expandable, of low cost and highly efficient. In some cases, the efficiency approaches or exceeds 99%. The arrangement 10 is comprised of as many duplicate switching layers as desired, The number of such switching layers defines the available resolution of the arrangement. The arrangement efficiently integrates multiple external power sources, including different AC and DC sources that may vary between high and low impedances, and blends one or more of their available output powers and voltages for storage in one or more of the cells and/or for delivery to one or more of the loads, If no or insufficient output power and voltage is available for a particular loading condition, then the cells assume the responsibility for blending one or more of their available stored powers and voltages for delivery to one or more of the loads. Power and voltage storage or transfer can occur simultaneously or sequentially.

The arrangement 10 can be described as an intelligent energy collector and distributor, that operates dynamically, i.e., in real time. The base layer and one or more switching layers can be mounted on a single printed circuit board (PCB). Additional PCBs having one or more switching layers can be easily interconnected to the first-mentioned PCB. The arrangement 10 employs a simple modular structure assembled in a repetitive pattern. The number of cells is defined by the maximum load power and voltage resolution required. Continuous or frequent monitoring of the state of the loads and of the sources is desired. By monitoring the monitor nodes, the controller 30 can detect whether any particular layer or PCB is defective, and can control the switches to bypass any such defective layer Or PCB.

It will be understood that each of the elements described above, or two or more together, also may find a useful application in other types of constructions differing from the types described above. For example, the two HEXFETs MA and MB and their diodes D4 and D5 can be replaced by a single FlipFET.

Turning now to the embodiment of FIGS. 6-7, FIG. 6 is identical to FIG. 1, except that the aforementioned slave controllers 44, 46 and 48 have been illustrated, one for each layer 64, 62 and 60. FIG. 7 depicts how these slave controllers 44, 46 and 48 are connected to a master controller 42. The nodes, cells, and switches in FIGS. 6-7 are identical in structure and function to those described above in FIGS. 1-3 and, hence, need not be repeated. Rather than relying on the master controller 30 alone to perform its above-described functions, in FIGS. 6-7, the master controller 42 and its slave controllers 44, 46 and 48 perform these same functions, but with greater speed and efficiency, as well as additional functions.

As shown in FIG. 7, the master controller 42 is connected to the slave controllers 44, 46 and 48 over bidirectional or handshake lines 50, 52 and 54. The master controller 42 has control outputs Control 1, Control 2, Control 3, Control 4 and Control 5 that are connected either to control inputs GX, G1, GA, GB and G2 of the slave controller 44 in switching layer 64, and/or to control inputs GY, G3, GC, GD and G4 of the slave controller 46 in switching layer 62. The slave controller 44 monitors the nodes N1, N2 and N3 and is connected to the control inputs GX, G1, GA, GB and G2. The slave controller 46 monitors the nodes N4, N5 and N6 and is connected to the control inputs GY, G3, GC, GD and G4. The slave controller 48 monitors the nodes N7, N8 and N9.

Thus, in accordance with this disclosure, the arrangement comprises a plurality of identical cells or power objects in the switching layers. Each power object contains a positive input/output and a negative input/output with blocking diodes to ensure polarities are not violated. There is always a connection to ground a connection to the power source, Power and ground can be of either polarity. At the center of the power objects are fast charge and discharge energy storage components, such as the aforementioned supercaps B-CAP 1, B-CAP 2 and B-CAP 3. Connected to all signal paths, with the exception of power, are the controllable switches, typically semiconductor devices, such as HEXFETS, By controlling these switches, the available power is directed to the power objects for charging and, as appropriate, power is then released to the desired load or target in such required forms as voltage, amperage, wave shape, and timing. Each of the switching layers has signal input and output lines for controlling the switches and for monitoring the power states available, and the load demands required and/or possible, for the best possible solution (performance) for any given moment n time, Controlling all this is the control system and programmable ROM. The various timings and component combinations define not only the state of the power, but also the shape and timing of the same.

The arrangement can be operated as a power pulse consumer (power charging), or as a power pulse generator (power supplier). Charging or discharging the cells can be performed as at least one timed function, or as a series of timed functions. These timed functions (pulses) can be very long or very short, or any time period in between. A rapid series of long pulses would yield a substantially constant output with little or no variability or shape, i.e., a straight horizontal line function, or DC voltage. Everything else would yield a variable output having at least a slope or even greater variability, or AC voltage. Since each power state can be composed of at least one or an aggregate of pulses (a pulse is comprised of voltage, amperage, and time) for a given time period, it becomes possible to shape any type of power charging function, or power consuming function, as required, for any given source, or any given load.

To further increase the versatility and power of this arrangement, the aforementioned slave controllers 44, 46 and 48 with accessible memory is added to each cell in each layer to make each cell "smart". The addition of localized "smart" cells provides the additional ability to transfer certain functions, such as charge state, noise control, timing, distortion, shape, etc. at the source where they can he better and faster managed, thereby expanding the sophistication and efficiency of the arrangement. The arrangement is always monitored and managed by the master controller with accessible memory for storing a truth table, and for executing additional subroutines for providing customized functionality, such as a specific wave shape, a power limitation, a load priority dropout, and/or a sequence table, etc. The slave controllers 44, 46 and 48 monitor local conditions in each layer the same way the master controller does, but each slave controller is assigned specific functions by the master controller to take over or supplement the functions of the master controller. Further, secondary or tertiary functions can be relegated to the slave controllers 44, 46 and 48, such as noise removal or switching distortions. The arrangement has the capability to develop many varied power management functions through software development on its hardware platform.

Figure 8:
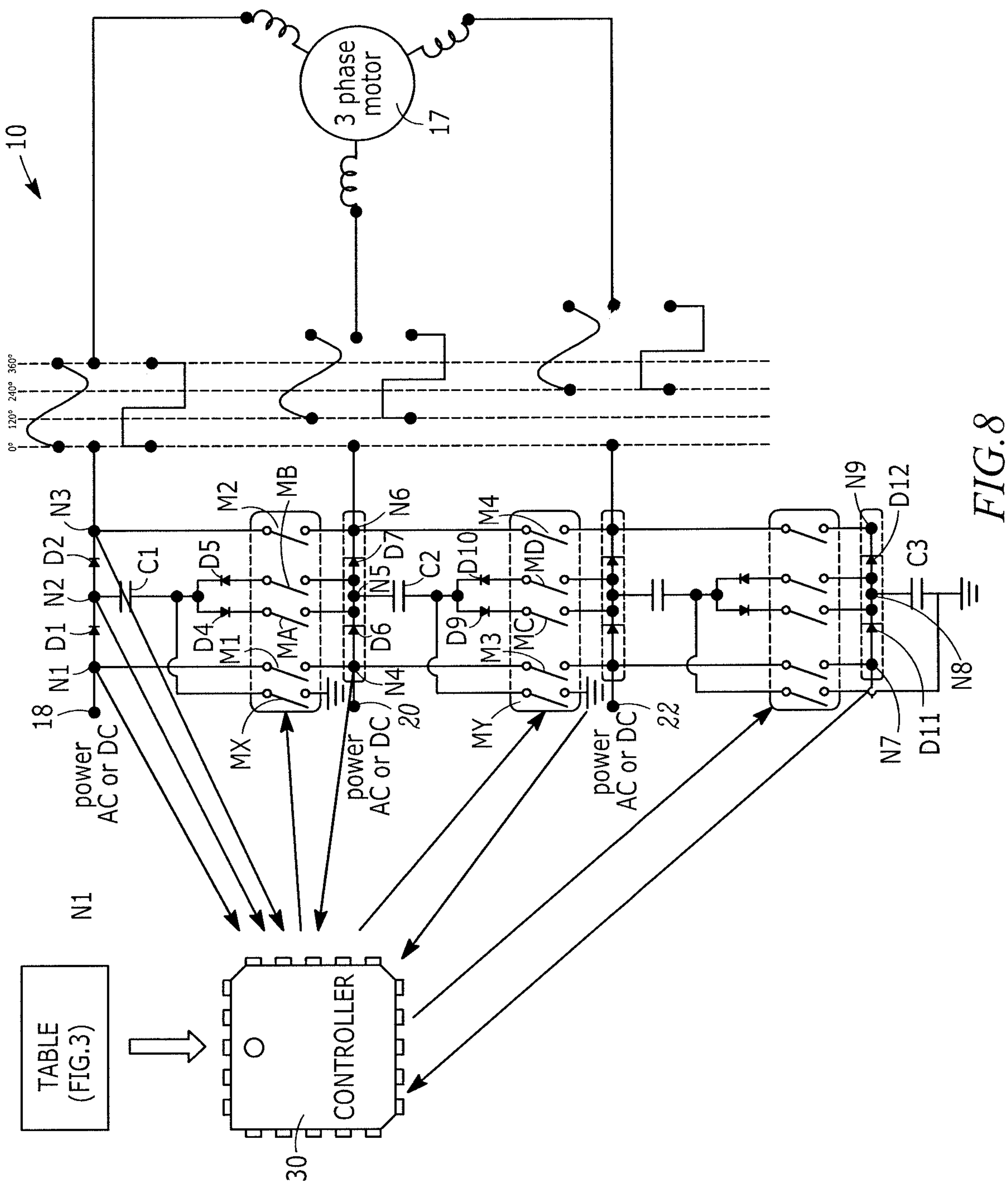
FIG. 8 is an electrical circuit schematic of an additional embodiment of an arrangement for dynamically managing electrical power between at least one electrical power source and at least one electrical load in accordance with this disclosure.

Turning now to the embodiment of FIG. 8, FIG. 8 is a simplified version of the embodiment of FIG. 1. The nodes, diodes, cells, switches, and master controller in FIG. 8 are identical in structure and function to those described above in FIGS. 1-3 and, hence, have not been repeated. The arrangement 10 of FIG. 8 has three switching layers and one base layer. The AC load 17 depicted in FIG. 8 is a three-phase motor. Each phase or winding of the motor receives a voltage of a desired waveform shape. This waveform may be any periodic waveform and, as shown, may be a sinusoid or a square wave, or it can be any non-periodic waveform. The three waveforms are spaced timewise apart by 120 degrees. The shaping and timing of each of these three periodic waveforms is controlled by the master controller 30 and its look-up table.

The controller 30 dynamically monitors the variable operating conditions at the monitor nodes N1-N9 during the variable operation of the electrical load and the power source, and switches the control switches M1-M4, MA-MD, MX-MY between the switching states in accordance with the look-up table and in response to the monitored operating conditions for supplying a voltage of the desired waveform shape to the load 17.

Figure 9:
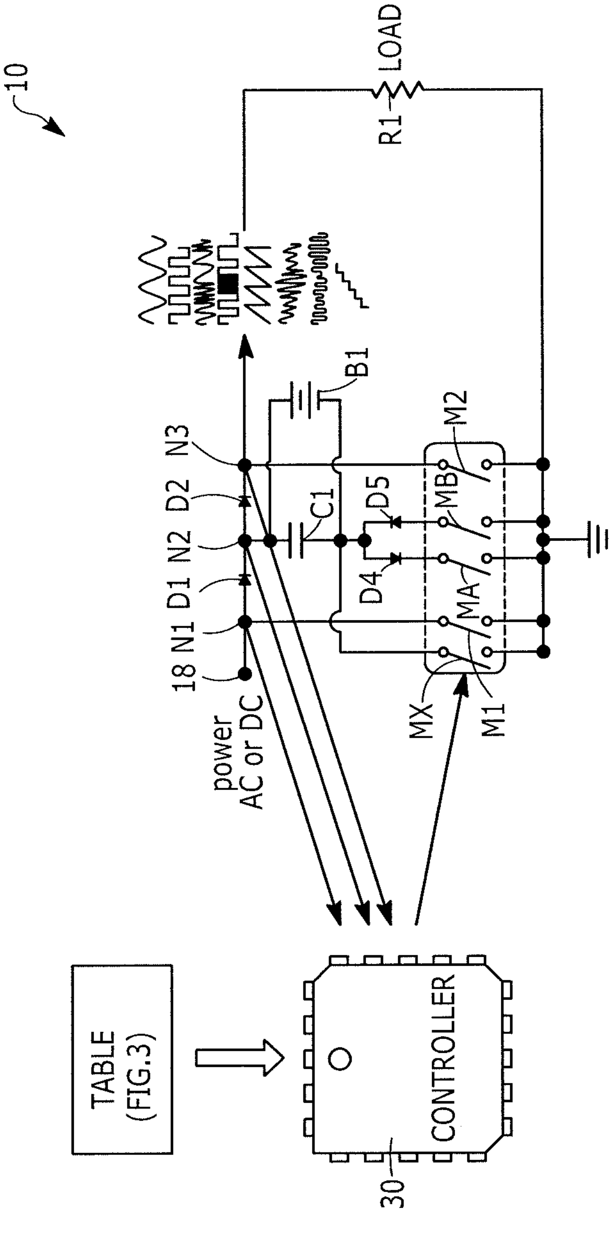
FIG. 9 is an electrical circuit schematic of a further embodiment of an arrangement for dynamically managing electrical power between at least one electrical power source and at least one electrical load in accordance with this disclosure.

Turning now to the embodiment of FIG. 9, FIG. 9 is a simplified version of the embodiment of FIG. 1. The nodes, diodes, cell, switches, and master controller in FIG. 9 are identical in structure and function to those described above in FIGS. 1-3 and; hence, have not been repeated. The arrangement 10 of FIG. 8 has a single switching layer. The load R1 depicted in FIG. 9 is a resistive load. A battery B1 is shown in parallel with the capacitor C1. A plurality of many different, arbitrary waveforms is depicted in FIG. 9. The shaping and timing of each of these arbitrary waveforms is controlled by the master controller 30 and its look-up table. The controller 30 dynamically monitors the variable operating conditions at the monitor nodes N1-N3 during the variable operation of the electrical load and the power source, and switches the control switches M1-M2, MA-MB, MX between the switching states in accordance with the look-up table and in response to the monitored operating conditions for supplying a voltage of the desired waveform shape to the load R1. In FIG. 9, the battery B1 and the switch M1 are optional.

Figure 10:
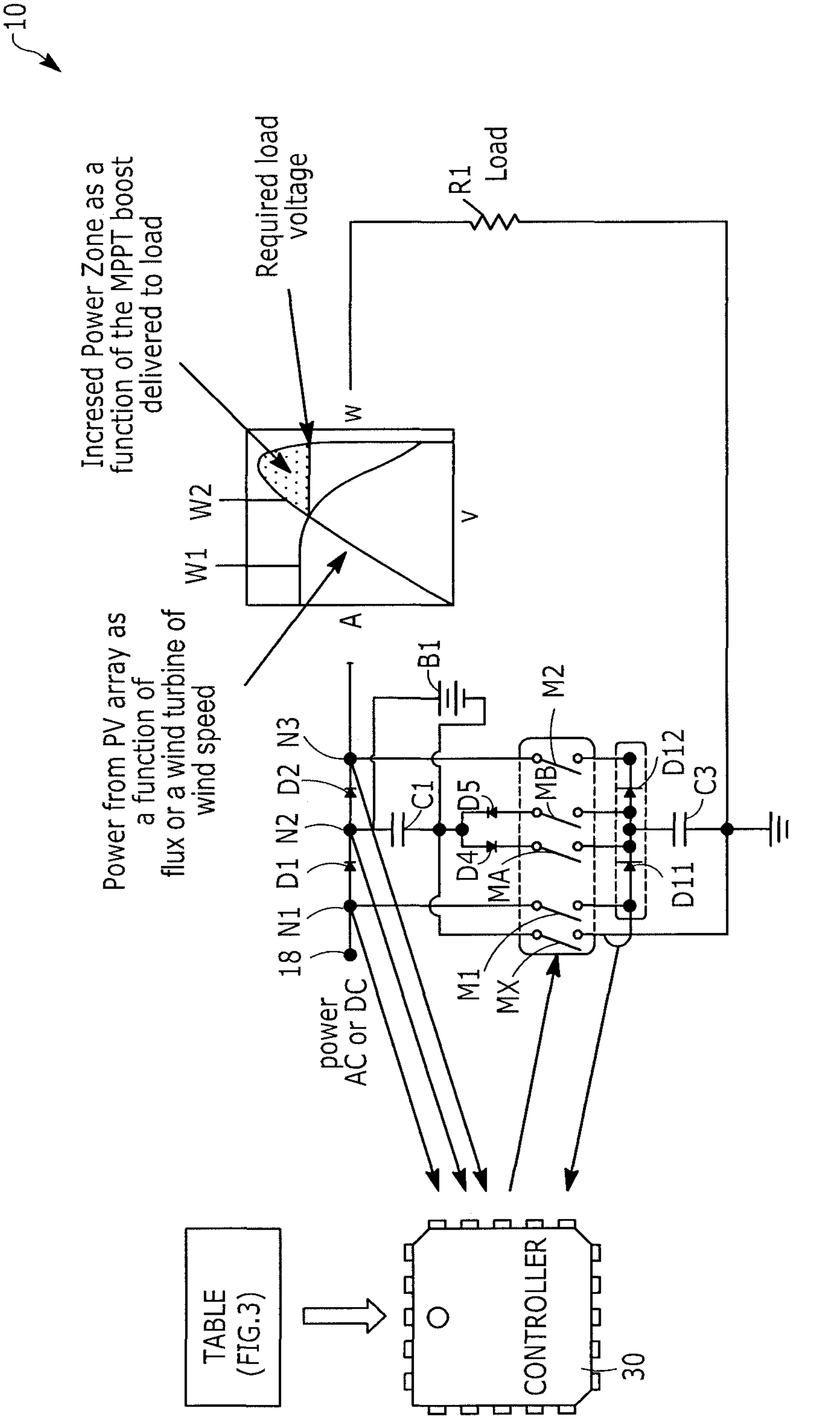
FIG. 10 is an electrical circuit schematic of yet another embodiment of an arrangement for dynamically managing electrical power between at least one electrical power source and at least one electrical load in accordance with this disclosure.

Turning now to the embodiment of FIG. 10, FIG. 10 is a simplified version of the embodiment of FIG. 1. The nodes, diodes, cell, switches, and master controller in FIG. 10 are identical in structure and function to those described above in FIGS. 1-3 and, hence, have not been repeated. The arrangement 10 of FIG. 10 has a single switching layer and a single base layer. The load R1 depicted in FIG. 9 is a resistive load. A battery B1 is shown in parallel with the capacitor C1.

A maximum power point tracking (MPPT) set of waveforms is depicted in FIG. 9 in a graph of current in amperes (A) versus voltage in volts (V) versus power in watts (W). The waveform W1 depicts how current varies with voltage and power from a solar installation having a photovoltaic (PV) array, or from a wind installation having wind turbines. Typically, the waveform W1 is not ideal for producing maximum available power at any given time. Hence, MPPT systems electronically operate the solar/wind installations to enable them to produce their maximum power at any given time by varying or boosting their voltages to maximum values, as depicted by waveform W2. The shaping and timing of the MPPT waveform W2 is controlled by the master controller 30 and its look-up table. The controller 30 dynamically monitors the variable operating conditions at the monitor nodes N1-N3 during the variable operation of the electrical load and the power source, and switches the control switches M1-M2, MA-MB, MX between the switching states in accordance with the look-up table and in response to the monitored variable operating conditions for supplying a voltage of the desired MPPT waveform W2 to the load R1. The voltage is the best possible voltage from the power source(s) to the load(s) in real time. In FIG. 10, the battery B1 and the switch M1 are optional.

While the invention has been illustrated and described as an arrangement for, and a method of, dynamically managing electrical power among one or more electrical power sources and one or more electrical loads, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A method of managing electrical power between an electrical power source that supplies electrical power and an electrical load that consumes the electrical power over an operating time period, the method comprising:

operatively connecting an electrical power storage cell to the power source in one of two switching states of a control switch for storing voltage in the power storage cell;

discharging the stored voltage from the power storage cell to the electrical load in the other of the switching states of the control switch;

continuously monitoring variable operating conditions at a plurality of monitor nodes throughout the operating time period of the electrical load; and switching the control switch between the switching states under control of a controller throughout the operating time period in immediate response to the monitored variable operating conditions, the switching being performed by the controller accessing a memory, and retrieving from the memory, data indicative of the switching states of the control switch to supply to the electrical load a shaped voltage having a variable magnitude at different times throughout the operating time period of the electrical load.

2. The method of claim 1, and configuring the power storage cell as a capacitor.

3. The method of claim 1, and configuring the power storage cell as a capacitor connected in parallel with a battery.

4. The method of claim 1, wherein the switching is performed by supplying the shaped voltage to the electrical load as a periodic voltage whose magnitude changes and repeats periodically throughout the operating time period of the electrical load.

5. The method of claim 4, wherein the electrical load is an inductive load having at least one input supplied with the periodic voltage, and wherein the switching determines a phase of the periodic voltage.

6. The method of claim 1, wherein the electrical power source is a renewable power source that supplies the electrical power with a variable power over time, and wherein the switching is performed to maximize the variable power supplied to the electrical load at any given time throughout the operating time period.

* * * * *